United States Patent
Pietiläinen et al.

(10) Patent No.: US 7,111,030 B2
(45) Date of Patent: Sep. 19, 2006

(54) METHOD OF DETECTING PILOT TONES IN A NOISY SIGNAL

(75) Inventors: Antti Pietiläinen, Espoo (FI); Mikko Söderlund, Helsinki (FI); Simo Tammela, Espoo (FI)

(73) Assignee: Nokia Corporation, Espoo (FI)

(*) Notice: Subject to any disclaimer, the term of this patent is extended or adjusted under 35 U.S.C. 154(b) by 639 days.

(21) Appl. No.: 10/450,515

(22) PCT Filed: Dec. 20, 2000

(86) PCT No.: PCT/FI00/01120

§ 371 (c)(1),
(2), (4) Date: Jun. 16, 2003

(87) PCT Pub. No.: WO02/51090

PCT Pub. Date: Jun. 27, 2002

(65) Prior Publication Data

US 2004/0053577 A1    Mar. 18, 2004

(51) Int. Cl.
G06F 17/10 (2006.01)
H04L 27/26 (2006.01)

(52) U.S. Cl. .................................... 708/312
(58) Field of Classification Search ............... 708/312
See application file for complete search history.

(56) References Cited

U.S. PATENT DOCUMENTS

| 6,940,843 | B1 * | 9/2005 | Goodall et al. ............ 370/338 |
| 6,985,548 | B1 * | 1/2006 | Jabbar et al. ............. 375/355 |
| 2002/0048063 | A1 * | 4/2002 | Jung et al. ................ 359/124 |
| 2004/0184484 | A1 * | 9/2004 | Marchok et al. ........... 370/480 |

FOREIGN PATENT DOCUMENTS

| EP | 0 876 025 A1 | 11/1998 |
| EP | 0 939 527 A1 | 9/1999 |
| WO | WO 98/10548 | 3/1998 |

* cited by examiner

Primary Examiner—Tan V. Mai
(74) Attorney, Agent, or Firm—Squire, Sanders & Dempsey L.L.P.

(57) ABSTRACT

This invention relates to detecting a pilot tone in an optical fiber. In the method described in the invention, computational complexity is reduced significantly by almost completely removing the need to carry out multipli-cations. To calculate certain spectral components of DFT (Discrete Fourier Transform) only a few multiplications are required. The idea is that for de-tecting one pilot tone, it is adequate to calculate one spectral component of DFT if a specific ratio can be chosen between the pilot tone frequency and the sample rate of the receiver.

28 Claims, 4 Drawing Sheets

METHOD OF DETECTING PILOT TONES IN A NOISY SIGNAL

FIELD OF THE INVENTION

This invention relates to detecting and measuring a pilot tone in an optical fiber. The optical fiber may contain many optical channels, each carrying a channel-specific pilot tone.

BACKGROUND OF THE INVENTION

In optical telecommunication transport networks different optical wavelength channels can be multiplexed into a single fiber. FIG. 1 shows a transmitting node (1) with a multiplexer (MUX) and transmitters (3) for inserting desired data and pilot signals into the fibers. The figure also shows a receiving node (2) with a demultiplexer (DEMUX) and receivers (4). Optical wavelength channels carrying data can be dropped or added in the nodes of the network, i.e. the nodes comprise transmitting and receiving elements. For monitoring which channels are present at a given place in the network, pilot tones specific to each wavelength channel can be superimposed (3) on the wavelength carriers. The carriers can be detected by tapping (5) a portion of the light, typically 10 percent, in a given place into a photodetector. To be more precise, the optical tap (5) diverts a small part of the optical power for extracting desired pilot tones (or a tone). The optical tap (or taps) can be located before (5) the demultiplexing (2) of the channels, after the demultiplexing, but before the receivers, or in the receivers.

FIG. 2 shows an example of an arrangement for detecting a pilot tone in the fiber (6). The pilot tone can be detected by filtering the signal obtained from a photodetector (13) through an optional bandpass filter (8) tuned to let through the frequency range of the pilot tones and to block most of the telecommunications data signals. It is also possible to tune the filter for letting only the desired pilot tone through. Usually, the signal from the photodetector is amplified (7) before the bandpass filter. If the pilot tone has a known modulation depth, the power of the optical carrier can be measured by measuring the amplitude of the pilot tone. Often, the measuring device (11) is a piece of digital equipment, such as a digital signal processor. Due to this the signal from the bandpass filter must be converted to a digital format. The converter (9) used gets a sampling rate from an adjustable oscillator (10). The management system (12) can use the measured amplitude of the pilot tone for any purposes required. Using pilot tone facilitates the detection of any purposes required. Using pilot tone facilitates the detection of the presence or absence of wavelength carriers, because neither optical filters nor the examining of the telecommunication data signal are required if pilot tones are used.

The pilot tone amplitude has to be low so as not to disturb the data signal. In addition, the data signal itself requires a broad frequency spectrum, starting from a few tens of kilohertz up to a few gigahertz. Furthermore, there can be tens or hundreds of wavelength channels of different power levels. Detecting weak pilot tones in an aggregate signal incorporating a multitude of other pilot tones, as well as noise due to the numerous data channels, is a challenge to the detection system. Since multiple fibers are connected to each node, the detection system should be as simple as possible.

A very sensitive method for detecting a pilot tone is to use a phase-locked loop in a receiver containing a local oscillator that is tuned to the pilot tone frequency. The signal from the photodetector multiplied by the local oscillator yields, after low-pass filtering, the amplitude of the pilot signal. By using the product signal as feedback into the local oscillator, the phase of the local oscillator can lock onto the pilot tone phase. In this solution, detecting tens of channels may be problematic because it takes time for the receiver to lock onto the phase of the received signal.

Another method is to sample and digitize the signal. The Fast Fourier Transform (FFT) technique is then applied on the data to extract the pilot tone amplitudes. Normally, calculating fast Fourier transform requires quite great processor power because a significant number of multiplications have to be carried out. For example, for a data set of 4096 samples, 49000 multiplications (with complex numbers) have to be carried out. If a powerful processor were not needed, cost savings would be obtained.

The objective of the invention is to avoid these drawbacks by minimizing the number of calculations while maintaining high sensitivity for detecting a pilot tone. This is achieved in a way described in the claims.

SUMMARY OF THE INVENTION

In the method described in the invention, computational complexity is reduced significantly by almost completely removing the need to carry out multiplications. To calculate certain spectral components of DFT (Discrete Fourier Transform) only a few multiplications are required. The idea is that for detecting one pilot tone, it is adequate to calculate one spectral component of DFT if a specific ratio can be chosen between the pilot tone frequency and the sample rate of the receiver. The clocks of the pilot tone transmitter and receiver have to be nearly synchronized but may have an arbitrary phase difference. Adequate synchronism is achieved simply through the inherent accuracy of, for example, free running crystal oscillators. The frequency of the calculated spectral component of DFT is preferably a quarter of the sample rate. Using these values, the correlation between the sampled signal values and the DFT spectral component includes only add or subtract operations with complex numbers. The period for recording the sample values should be short enough to avoid the accumulation of the phase difference between the measured pilot tone and a signal whose frequency corresponds to one fourth of the sample rate. As a result the DFT spectral component gives the amplitude of the pilot tone, which is compared to specific values for making a decision on whether the tone is present or not. It is possible to detect different pilot tones by changing the spectral component and also the sample rate. The management system can quickly get the pilot tone information concerning a certain channel. At least a few tens of pilot tones can be measured in a second.

BRIEF DESCRIPTION OF THE DRAWINGS

In the following the invention is described in more detail by means of FIGS. 1–6 in the attached drawings where.

DETAILED DESCRIPTION OF THE INVNTION

Normally when solving what spectral components a signal contains, Discrete Fourier Transform (DFT) or Fast Fourier Transform (FFT) is calculated. DFT and FFT output in the frequency domain all spectral components that the sample rate and number of samples enable. However, only one spectral component is solved according to the invention. In fact, the component solved by the inventive method is one component of DFT. By using this component multiplications can be removed. Certain prerequisites must be satisfied for finding the component.

Figure 3:
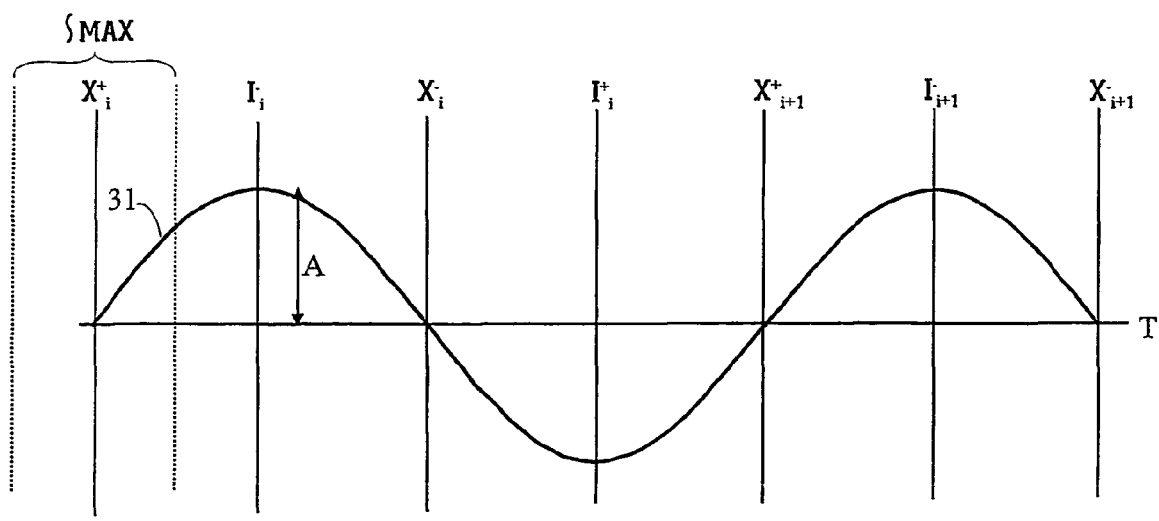
FIG. 3 illustrates an example of how samples associate with the pilot signal to be detected.

Let's examine FIG. 3. The sine signal (31) describes a pilot tone that is to be detected and measured. Assuming that the signal in the fiber contains only the pilot tone (no data) helps to construe FIG. 3. $X^+_i$, $I^-_i$, $X^-_i$, $I^+_i$, etc. illustrate samples at different moments when the value of the signal is recorded and forwarded for calculating the spectral component. As can be noticed, the sample rate is four times the frequency of the pilot tone. The sample rate can be another, but then certain multiplications are needed, as described later. Assuming that the amplitude (A) of the tone is 1, the next sample values are recorded: $X^+_i=0$, $I^-_i=1$, $X^-_i=0$, and $I^+_i=-1$. Putting these values into Equation 1 the amplitude A is 1 over the measurement period (in this case one signal period) as it should be. It is worth noting that the equation is reduced from a single frequency component of a discrete Fourier transform where the frequency is ¼ of the sample rate. The difference of the $X_i^+$ and $X_i^-$ values represents the real amplitude of the signal at this frequency, and the difference of the $I_i^+$ and $I_i^-$ values represents the imaginary amplitude of the signal. The absolute value of the complex number A describes the total amplitude of the measured signal at this frequency. Parameter n is the number of pilot signal periods over the measurement period.

$$A = \frac{1}{2n}\sum_{i=0}^{n-1} X_i^+ - X_i^- + j(I_i^+ - I_i^-) \quad (1)$$

Figure 4:
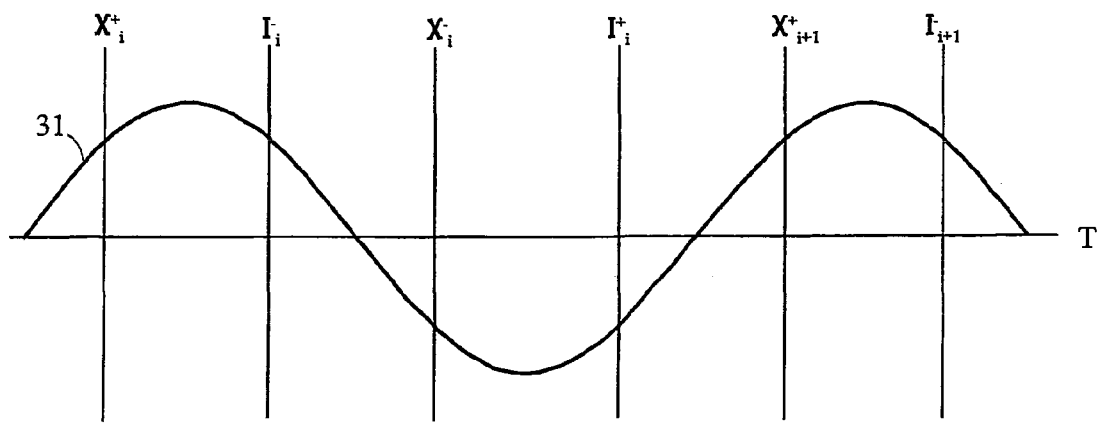
FIG. 4 illustrates another example of how samples associate with the pilot signal to be detected.

The phase of the signal to be measured may be arbitrary. FIG. 4 describes the signal with a different phase as compared to the situation in FIG. 3. Now, when the amplitude of the tone is still 1, the sample values are: $X^+_i=0{,}7071$, $I^-_i=0{,}7071$, $X^-_i=-0{,}7071$ and $I^+_i=-0{,}7071$. Putting these values into Equation 1 the amplitude gets the value 1 when the absolute value of the complex amplitude is calculated. It can be shown that the phase of the signal can be any phase.

So according to the above mentioned matters, multiplications are not needed. The prerequisites for this are: knowing the frequency of the desired pilot tone, selecting a suitable sample rate, and quasi-synchronizing the pilot tone with the sample rate. The frequency of the pilot tone must be known beforehand for adjusting the bandpass filter, setting the right sample rate, and quasi-synchronizing the pilot tone and sample rate.

The sample rate should preferably be four times the frequency of the pilot tone. Using this rate multiplications are not needed. The number of samples can be other than four per period of the pilot tone. (i.e the sample cycle is the period of the pilot tone in this case.) For example 3, 5, 6, etc. samples per period are suitable. However, if another rate than four samples per period is used, the equation is altered since certain coefficients are required for each sample value. This indicates a need for a multiplication engine. However, the same coefficients are repeated in every period of the pilot tone, so adding and subtraction are sufficient until the end of the recording period, when the accumulated sums are multiplied by the coefficients.

There can also be p/q samples per period of the pilot tone where p and q are positive integer values and p/q>2 (i.e. p samples are obtained for every q periods of the measured signal). In this case the number of recorded periods of the pilot tone must be a multiple of q. In the worst case p sums have to be accumulated and multiplied by non-integer coefficients at the end of the recording period.

The sample rate can be smaller than presented above by using similar methods as in sampling oscilloscopes to assign the samples to certain phases of the signal.

The frequency of the pilot tone and the sample rate must be quasi-synchronized. The quasi-synchronism is achieved by acquiring a limited number of pilot tone cycles per measurement, for example 1000. During the measurement time the phase of the sample cycle (samples during a period of the pilot tone) and the phase of the pilot tone remains approximately the same. This is possible with the accuracy of a standard crystal oscillator, which is typically 50 parts per million. Thus, phase locking is not required. An arbitrary phase difference between the transmitter and receiver is accepted because 4 samples per period are acquired and samples having a 90 degree phase difference are handled separately.

Since the phase difference, as mentioned above, remains approximately the same, the samples can be summed directly and no multiplication as in FFT is required. The calculation of the complex amplitude (A) of the pilot tone is portrayed in equation 1. The amplitude of the pilot tone is obtained by calculating the absolute value of the complex amplitude (A).

Analog integration of the input voltage can be used when registering the samples. The integrating time (FIG. 3, ∫MAX) of each sample can be very short for obtaining the most accurate value for A if noise was not present. The maximum integration time per sample is one fourth of a period (when using four samples per period). At maximum integration time high-frequency noise is filtered at the expense of a slight error in the measurement. The error can be corrected because it is only about 10% of the signal amplitude and does not depend on the phase difference between the signal and the sample cycle.

Figure 5:
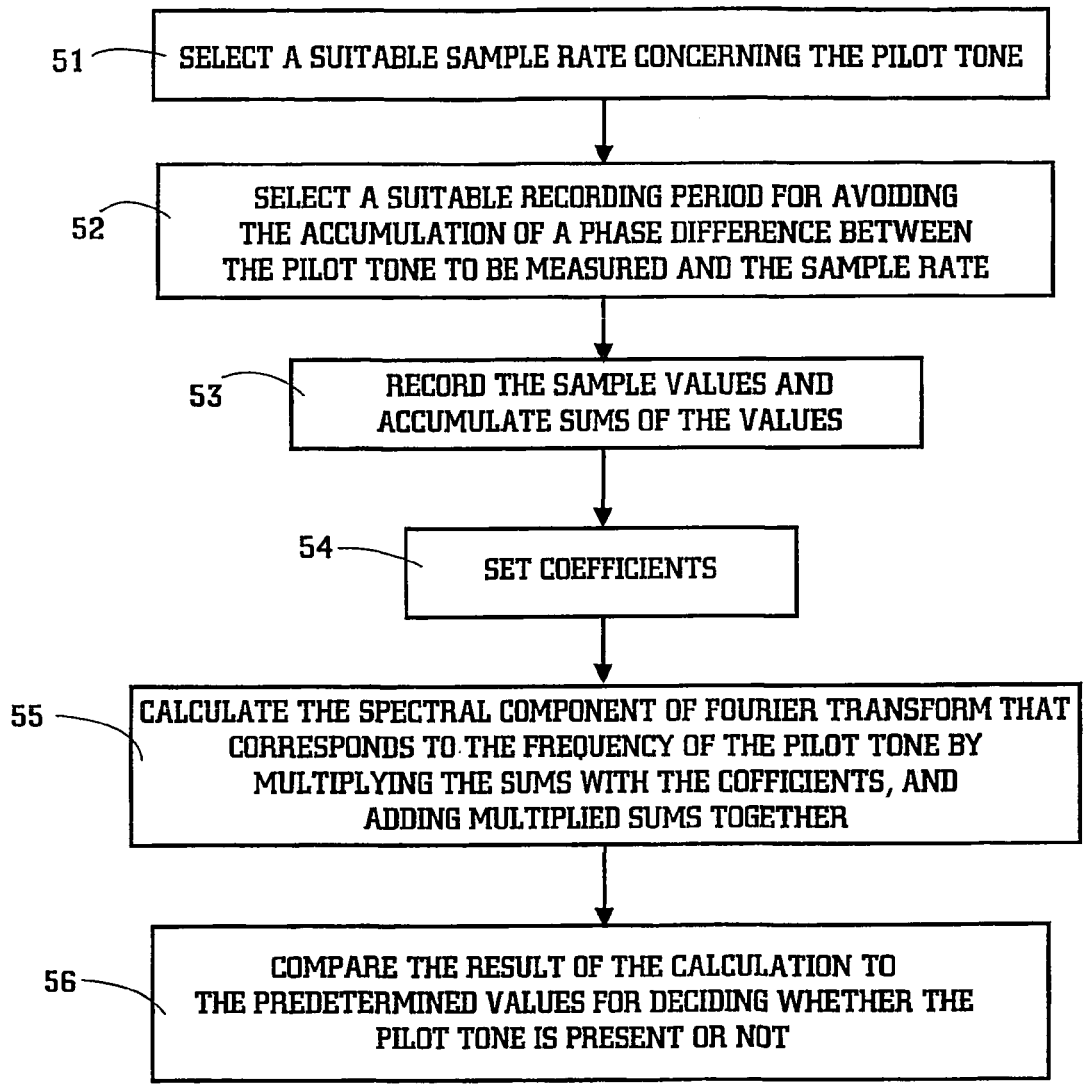
FIG. 5 shows an instance of the invention in a flowchart form.

FIG. 5 shows the invention in a flowchart form. First, a suitable sample rate must be selected (51) concerning the pilot tone and the accuracy needs. The pilot tone frequency (and waveform) is known beforehand. The phase of the sample cycle should not drift as compared to the phase of the pilot tone, so the sample rate is synchronized with a sufficient accuracy to the pilot tone. The accuracy of a crystal oscillator, 50 ppm, typically used as a clock frequency source, is adequate for the measurement, and in such a case no synchronization procedure is required. By selecting a suitable (short enough) recording period (52), the accumulation of a phase difference between the pilot tone to be measured and the sample rate can be avoided. After these steps, the measurement equipment is ready to record (53) the sample values, and to accumulate the sums of the values according to equation 1. Depending on the selected sample rate, the coefficients that are used to multiply the accumulated sums of the sample values in the end must be set (54). The DFT spectral component is calculated (55) concerning the pilot tone for obtaining the amplitude of the pilot tone. It is also possible to think that accumulating the sums (53), setting coefficients (54), and calculating the spectral component (55) together form Fourier transformation for the desired spectral component, but dividing these phases into separate blocks gives a more illustrative picture. Finally, the calculated amplitude is compared (56) to the predetermined values which indicated the existence of the pilot tone or the lack of the pilot tone. The result of this comparison tells whether the pilot tone is present or not. It should be noted that leaving the final phase (56) out, the method can be used just for measuring the amplitude of the pilot tone.

Figure 6:
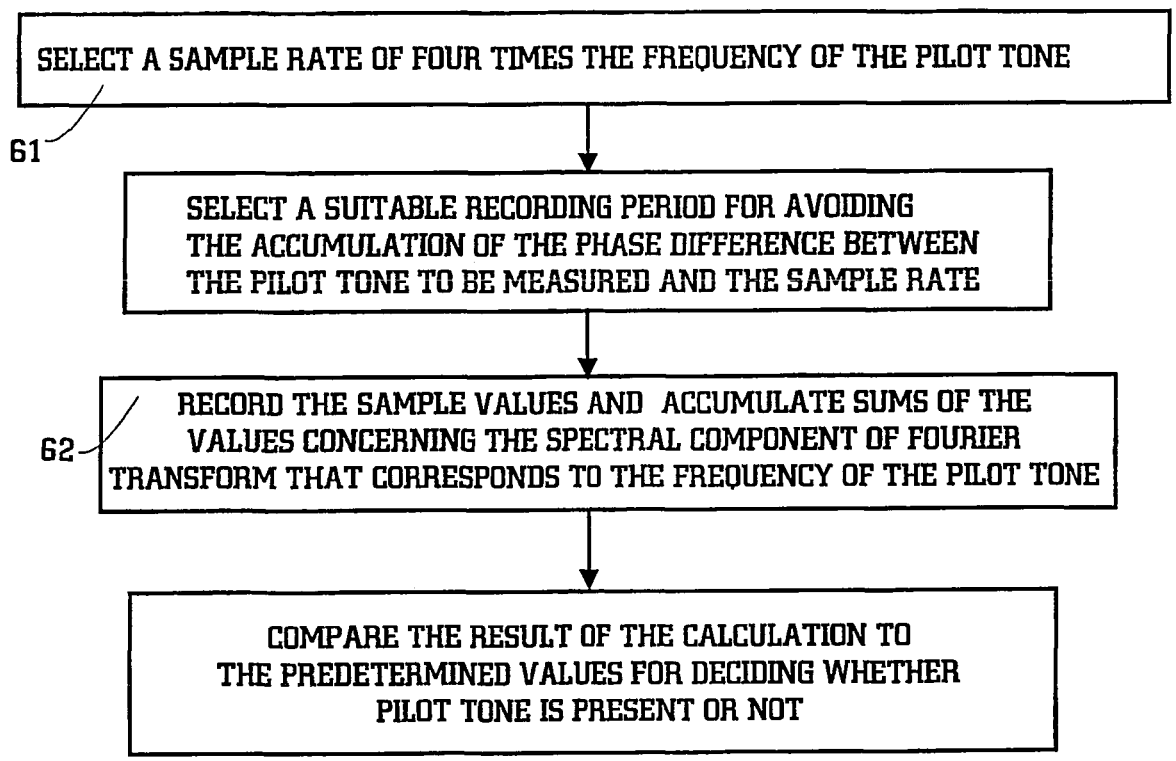
FIG. 6 shows another instance of the invention in a flowchart form.

FIG. 6 illustrates a preferable embodiment of the invention in a flowchart format. In this case, the sample rate is selected (61) to be four times the frequency of the pilot tone. Using this sample rate, the coefficients of the sample values do not need to be set (compare phase 54 in FIG. 5), and thus multiplying the sums by the coefficients (phase 55 in FIG. 5) is not needed. Accumulating the sums of the values (62) corresponds to the spectral component of Fourier transform.

Figure 1:
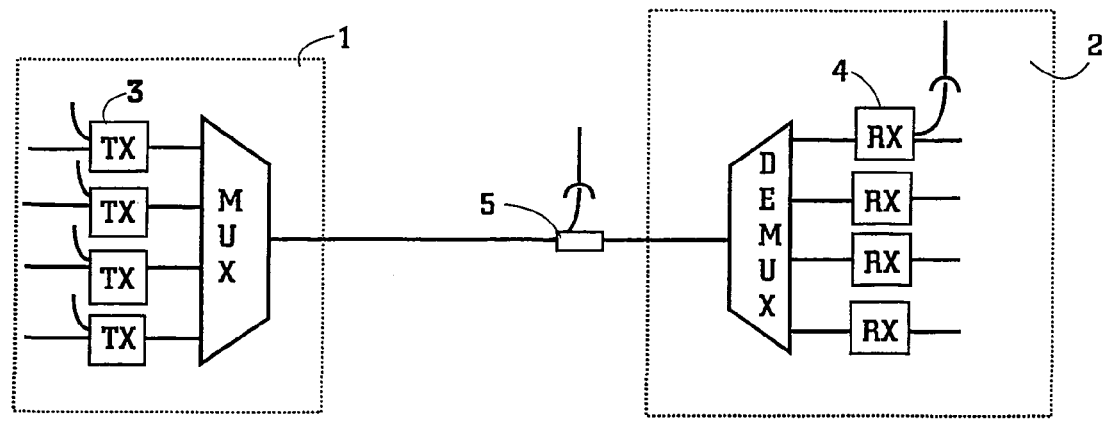
FIG. 1 illustrates an example of optical multiplexing and demultiplexing devices, and inserting pilot tones to optical channels and tapping fibers for detecting the pilot tones.
Figure 2:
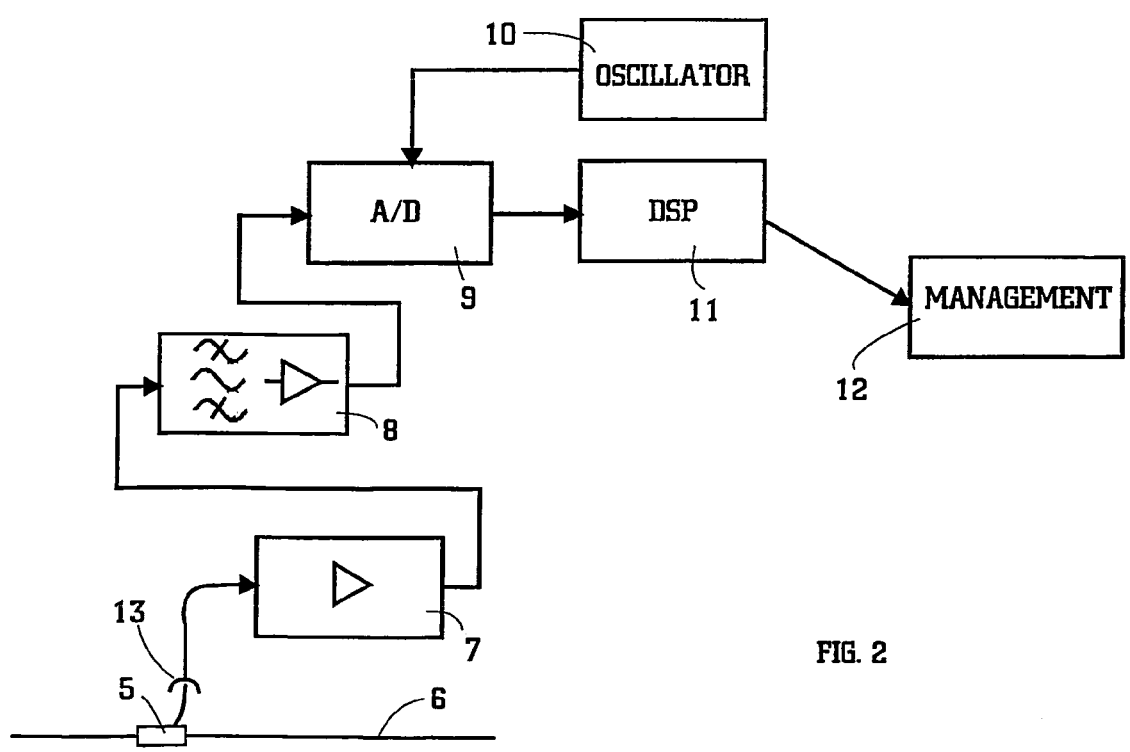
FIG. 2 illustrates an example of an arrangement to measure a pilot tone.

The arrangement according to the invention is similar to FIG. 2. However, the measuring device (12) does not need to be a powerful processor, but it can be a simpler device. Naturally, this saves costs.

In the present invention the goal is to minimize the computational effort while maintaining high sensitivity. For example, in a case of using FFT (Fast Fourier Transform) for a 4096 sample data set, 49000 multiplications (with complex numbers) have to be carried out. In FFT, only a part of the calculations can be carried out before the last sample is obtained. Thus, the result is obtained after an additional delay, after obtaining the last sample.

On the other hand, in the method according to the invention 4100 add or subtract operations with complex numbers are required for the correlation procedure to detect one pilot tone from an equivalent data set of 4096 samples. No multiplications have to be carried out except for normalizing the result. The result of the correlation procedure is available almost instantly after the last sample has been obtained.

However, if a large number of pilot tones are to be detected, the computational advantage of the method is lower than in the case of one channel, because the number of operations increases linearly with the number of channels as compared to FFT where all channels are detected by a single transform. On the other hand, the management usually has other means to detect problems associated with a certain channel, for example, by detecting the channel dropped at the channel termination. Consequently, the management can instruct all nodes along the trail to measure immediately that channel and get the results quickly. A reasonably large number of channels can be monitored continuously because a simple microcontroller is adequate for detecting several tens of channels per second.

The synchronism between the pilot tone and the sample rate assures that practically the whole signal amplitude is represented by the spectral component calculated. If the signal is not synchronized with the sample rate, a quadratic sum of about 10 spectral components of DFT have to be calculated to obtain the amplitude of the pilot tone. 10 spectral components, approximately doubles the noise-induced error in the final result. In addition, there will be more cross-talk from other pilot tones.

Different pilot tones can be detected by changing the sample rate of the receiver. A very good selectivity between different pilot tones can be achieved if the pilot tone frequencies are selected so that all pilot tones experience an integer number of oscillations within the duration of the measurement. This can be achieved if the pilot tone frequencies are equally spaced and the duration of the measurement is the same for all tones.

If, however, pilot tone frequencies are obtained by division of the frequency of a clock that is identical for all pilot tone generators, equal frequency spacing is not achieved. In this case the pilot tones should be arranged in pairs. Frequency spacing between the tones comprising the pair can be smaller than between the neighboring pairs. It is possible to select a measurement period for a pair of pilot tone frequencies produced by division of the frequency of identical clocks, so that both tones experience an integer number of oscillations during the period.

In the proposed system only a few bytes of random access memory are required, which further reduces the silicon area consumed by the system. It is evident that the invention is not restricted to the examples above, but it can also be used in other solutions, in the scope of the inventive idea.

The invention claimed is:

1. A method for detecting the presence of a pilot tone, whose characteristics are known, in a signal, the method comprising the steps of sampling the signal, and recording the values of the samples from a desired recording length, wherein the method further comprises the steps of
    calculating one spectral component of Fourier transform for the values of the samples, and
    comparing the result of the calculation to at least one predetermined value for deciding whether the pilot tone is present or not.

2. A method according to claim 1, wherein the sampling step includes the step of selecting a suitable sample rate depending on the features of the pilot tone, the signal, and the sampling step.

3. A method according to claim 2, wherein the selecting step the sample rate is chosen to be four times the frequency of the pilot tone.

4. A method according to claim 3, wherein the calculating step comprises the step of accumulating sums of the values.

5. A method according to claim 2, wherein when selecting the sample rate to be different than four times the frequency of the pilot tone, a step of setting coefficients for the calculating step is between the step of recording the values and the step of calculating one spectral component of Fourier transform.

6. A method according to claim 5, wherein the calculating step comprises the steps of accumulating sums of the values, multiplying the sums by the coefficients, and adding multiplied sums together.

7. A method according to claim 1, further comprising integrating the signal when recording the values for the samples.

8. A method according to claim 1, further comprising reducing crosstalk between pilot tones when several signals with pilot tones exist, by equally spacing frequencies of pilot tones and selecting a specific measurement time for the pilot tones to ensure the reduction of crosstalk.

9. A method according to claim 8, further comprising selecting an equal measurement time for the pilot tones to ensure the reduction of crosstalk.

10. A method according to claim 1, further comprising reducing crosstalk between pilot tones when several signals with pilot tones exist, by arranging the pilot tones in pairs with a pair-specific frequency difference and a pair-specific measurement time.

11. A method according to claim 1, further comprising reducing crosstalk between pilot tones when several signals with pilot tones exist, by arranging the pilot tones in pairs with a specific frequency difference and a specific measurement time, both being equal to all pairs.

12. A method for measuring a pilot tone, which pilot tone's characteristics are known, in a signal, the method comprising the steps of sampling the signal, and recording the values of the samples from a desired recording length, wherein the method further comprises the steps of
   calculating one spectral component of Fourier transform for the values of the samples, and
   using the calculated spectral component as a measure of the amplitude of the pilot tone.

13. A method according to claim 12, wherein the sampling step includes the step of selecting a suitable sample rate depending on the features of the pilot tone, the signal, and the sampling step.

14. A method according to claim 13, wherein in the selecting step the sample rate is chosen to be four times the frequency of the pilot tone.

15. A method according to claim 14, wherein the calculating step comprises the step of accumulating sums of the values.

16. A method according to claim 13, wherein when selecting the sample rate to be different than four times the frequency of the pilot tone, a step of setting coefficients for the calculating step is between the step of recording the values and the step of calculating one spectral component of Fourier transform.

17. A method according to claim 16, wherein the calculating step comprises the steps of accumulating sums of the values, multiplying the sums by the coefficients, and adding multiplied sums together.

18. A method according to claim 12, further comprising integrating the signal when recording the values for the samples.

19. A method according to claim 12, further comprising reducing crosstalk between pilot tones when several signals with pilot tones exist, by equally spacing frequencies of pilot tones and selecting a specific measurement time for the pilot tones to ensure the reduction of crosstalk.

20. A method according to claim 19, further comprising selecting an equal measurement time for the pilot tones to ensure the reduction crosstalk.

21. A method according to claim 12, further comprising reducing crosstalk between pilot tones when several signals with pilot tones exist, by arranging the pilot tones in pairs with a pair-specific frequency difference and a pair-specific measurement time.

22. A method according to claim 12, further comprising reducing crosstalk between pilot tones when several signals with pilot tones exist, by arranging the pilot tones in pairs with a specific frequency difference and a specific measurement time, both being equal to all pairs.

23. An arrangement for detecting the presence of a pilot tone, whose characteristics are known, in a signal, the arrangement comprising sampling means for sampling the signal, and recording means for recording the values of the samples, wherein the arrangement further comprises
   means for calculating one spectral component of Fourier transform for the values of the samples,
   means for comparing the result of the calculation to at least one predetermined value for deciding whether the pilot tone is present or not.

24. An arrangement according to claim 23, wherein the arrangement further comprises means of setting coefficients of the values of the samples.

25. An arrangement according to claim 23, wherein the recording means further comprises means of selecting a recording length.

26. An arrangement for measuring a pilot tone, which pilot tone's characteristics are known, in a signal, the arrangement comprising sampling means for sampling the signal, and recording means for recording the values of the samples, wherein the arrangement further comprises
   first means for calculating one spectral component of Fourier transform for the values of the samples,
   second means, respective to first means, for recording the value of the calculated spectral component as a measure of the amplitude of the pilot tone.

27. An arrangement according to claim 26, wherein the arrangement further comprises means of setting coefficients of the values of the samples.

28. An arrangement according to claim 26, wherein the recording means further comprises means of selecting a recording length.

* * * * *